(12) United States Patent
Leibold

(10) Patent No.: US 7,751,522 B2
(45) Date of Patent: Jul. 6, 2010

(54) COVERING ELEMENT FOR A REACTOR CORE OF A NUCLEAR INSTALLATION, AND NUCLEAR REACTOR

(75) Inventor: Friedrich Leibold, Happurg (DE)

(73) Assignee: Areva NP GmbH, Erlangen (DE)

( * ) Notice: Subject to any disclaimer, the term of this patent is extended or adjusted under 35 U.S.C. 154(b) by 0 days.

(21) Appl. No.: 11/500,035

(22) Filed: Aug. 7, 2006

(65) Prior Publication Data

US 2010/0124305 A1 May 20, 2010

(30) Foreign Application Priority Data

Aug. 5, 2005 (DE) ........................ 10 2005 037 589

(51) Int. Cl.
*G21C 19/42* (2006.01)
(52) U.S. Cl. .................... 376/294; 376/263; 376/205
(58) Field of Classification Search ................ 376/294, 376/293, 295, 296, 262, 263, 205
See application file for complete search history.

(56) References Cited

U.S. PATENT DOCUMENTS

| 3,318,779 | A | * | 5/1967 | Turner et. al. ................ 376/423 |
| 4,115,193 | A | * | 9/1978 | Sepelak ........................ 376/206 |
| 4,192,717 | A | * | 3/1980 | Gross .......................... 376/463 |
| 4,240,561 | A | * | 12/1980 | Hagstrom et al. ............ 220/327 |
| 4,348,356 | A | * | 9/1982 | Golden et al. ................ 376/461 |
| 4,459,261 | A | * | 7/1984 | Kolodzey et al. ............ 376/285 |
| 4,786,461 | A | * | 11/1988 | Veronesi et al. ............. 376/285 |
| 4,818,476 | A | * | 4/1989 | Gasparro ..................... 376/294 |
| 5,538,381 | A |   | 7/1996 | Erbes |
| 6,055,288 | A | * | 4/2000 | Schwirian .................... 376/302 |
| 6,618,460 | B2 | * | 9/2003 | Baliga et al. ................. 376/261 |

FOREIGN PATENT DOCUMENTS

DE             19519903 A1      12/1995

OTHER PUBLICATIONS

IAEA-TEDOC-1441, "Effects of nickel on irradiation embrittlement of light water reactor pressure vessel steels," Jun. 2005, pp. 1-15.*
Merriam-Webster's Collegiate Dictionary, tenth edition, 1993, p. 244.*

* cited by examiner

*Primary Examiner*—Rick Palabrica
(74) *Attorney, Agent, or Firm*—Laurence A. Greenberg; Werner H. Stemer; Ralph E. Locher

(57) ABSTRACT

A covering element for a reactor core of a nuclear installation provides a secure and tight closure of the reactor core in an operating state and at the same time being simple and cost effective to produce. The covering element is easily disassemblable during maintenance or loading processes and provides good possibilities for intervention in the reactor core. For this purpose, the covering element has a closure head and a separate support ring. The support ring is joined form-lockingly and/or force-lockingly to the closure head.

19 Claims, 3 Drawing Sheets

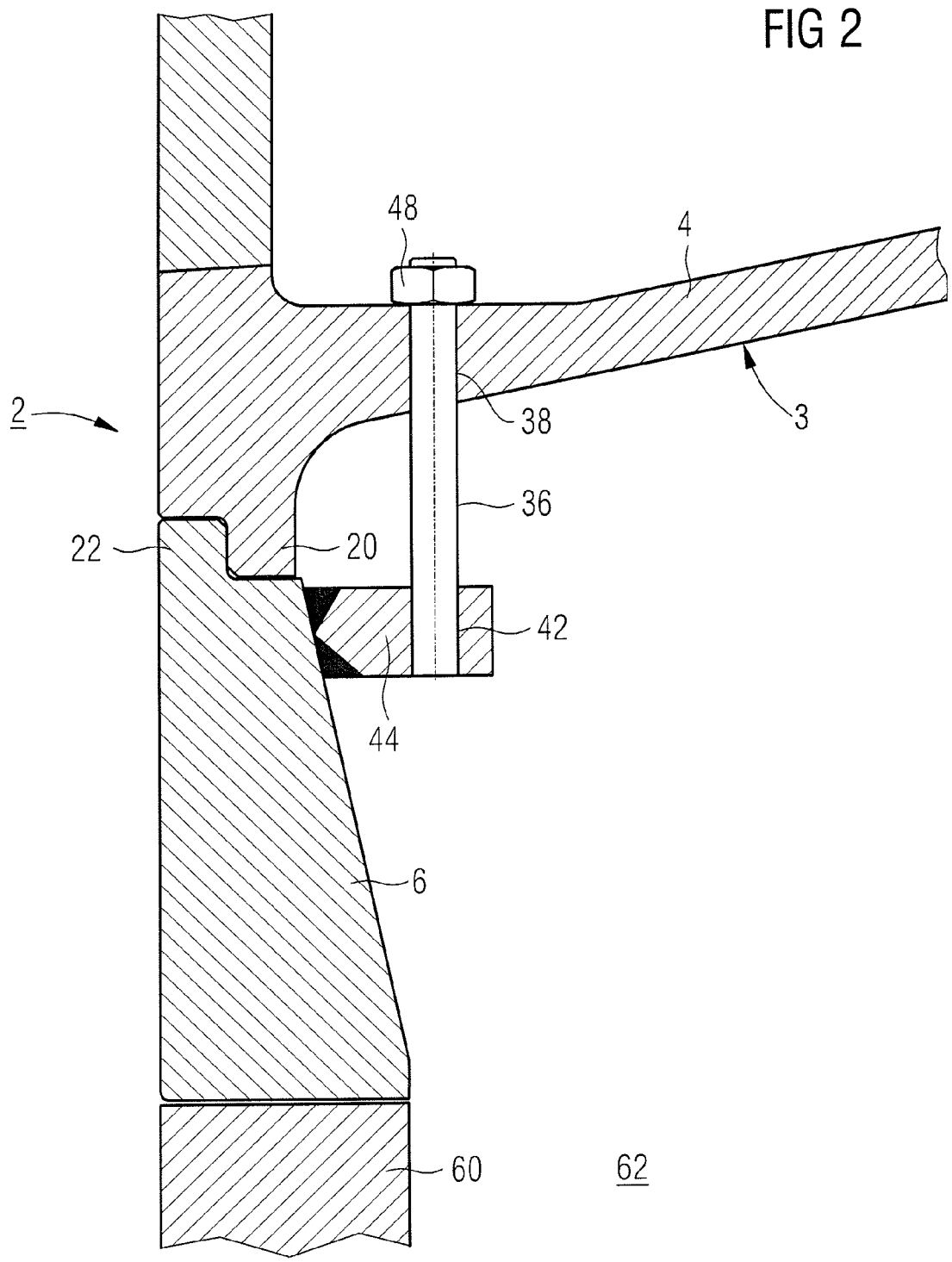

US 7,751,522 B2

COVERING ELEMENT FOR A REACTOR CORE OF A NUCLEAR INSTALLATION, AND NUCLEAR REACTOR

BACKGROUND OF THE INVENTION

Field of the Invention

The invention relates to a covering element for a reactor core of a nuclear installation. It also relates to a nuclear reactor having such a covering element.

Boiling water reactors have a reactor pressure vessel filled with cooling water, in which the reactor core containing fuel assemblies is disposed. The reactor core is usually laterally enclosed by a cylindrical core shroud. The fuel assemblies are held in a so-called core grid which is disposed at the top end of the core shroud. Towards the top, the reactor core is closed off with a closure head which is usually dome shaped or hemispherical. In the closure head, there is a number of penetration ports. When the nuclear reactor is in operation, the cooling water located in the reactor pressure vessel is heated up and partially vaporized due to the nuclear reaction occurring in the reactor core. The water/steam mixture generated in this manner enters through the penetration ports in the closure head into the adjoining so-called standpipes of the water/steam separator. From there, it is conducted into the steam dryer. After that, the dried main steam, which is under high pressure and under high temperature, is conducted out of the pressure vessel via a main steam line and supplied to a steam turbine coupled to a generator for generating electrical energy.

The closure head is usually subject to particularly high requirements with regard to its resistance to pressure and tightness. As a rule, it is therefore constructed as a forged monolithic part. The closure head must also be mounted removably on the core shroud or on the core grid, respectively, for maintenance work on the reactor core and particularly for exchanging fuel assemblies. Furthermore, a sufficiently large vertical distance is provided between the closure head and the core grid for advantageous influence on and calming of the steam flow before it enters into the standpipes of the steam/water separator. This distance can be implemented by molding an intermediate ring, also called a support ring, onto the dome-shaped cover shell of the closure head, the intermediate ring being fixed to the core grid or to the cylindrical core shroud at its lower edge in the operating state of the reactor. However, such a configuration of the closure head as a forged monolithic part is problematic and associated with high production costs due to its size and its complex shape.

SUMMARY OF THE INVENTION

It is accordingly an object of the invention to provide a covering element for a reactor core of a nuclear installation, and a nuclear reactor which overcomes the above-mentioned disadvantages of the prior art devices of this general type, which provides a reliable and tight closure of the reactor core in its operating state under the given geometric boundary conditions and at the same time keeping production simple and cost-effective.

The covering element should also be easily disassemblable during maintenance or loading processes and at the same provide good possibilities for intervening in the reactor core. According to the invention, the object is achieved in that the covering element has a closure head and a separate support ring, the support ring being joined force-lockingly and/or form-lockingly to the closure head.

The invention is based on the concept that the covering element should be constructed at least in two parts with regard to a supportable production effort. A closure head with a cover shell in the form of a flattened hemisphere (dome) and a support ring which can be joined to the cover with accurate fit being provided as separate individual parts. The joint between the two components should be of such a nature that, during the disassembly of the closure head, for example for changing fuel elements, the support ring can be lifted out of the reactor pressure vessel together with the closure head in one operation so that particularly good access possibilities in the reactor cores with correspondingly large freedoms of movement are obtained.

In principle, the closure head could be welded to the support ring for this purpose. However, this requires bulk welding seams which are associated with time-consuming and cost-consuming welding work and, in addition, possibly have increased susceptibility to corrosion. Due to the welding process, heat is introduced into the material of the closure head and of the support ring. The introduction of heat may have such an effect that the susceptibility of the material to corrosion, particularly to stress corrosion cracking, increases. A welding seam between the closure head and the underlying support ring could therefore be associated with a high expenditure for repetitive visual inspections for the operator of the nuclear power plant. Instead of a welding seam construction for material closure for joining the two components, therefore, an alternative form-locking and/or force-locking connection or attachment is therefore provided in the present concept. This reduces the susceptibility to corrosion and reduces the inspection expenditure particularly close to the core with comparatively high radiation exposure. Both the closure head and the support ring are in each case preferably constructed as forged monolithic parts, wherein, in particular, austenitic materials can be used.

The covering element is preferably constructed in such a manner that the closure head rests in the operating position with its circular edge on the end face of the support ring facing it. Normally, i.e. during the operation of the nuclear reactor, only the end support faces of the support ring are loaded by the inherent weight of the closure head and possibly by the surface pressure of holding springs acting on a steam dryer above the closure head. Twisting forces applied from above are thus conducted down to the support ring directly via the support faces without loading the connecting elements provided for producing the form-locking and/or force-locking connection. Such connecting elements thus only need to transfer or provide significant holding forces during the assembly or disassembly process of the closure head. In particular, they also prevent mutual twisting of the two components joined to one another, for example when the closure head, after a change of fuel assemblies, is lowered again into its operating position on the core grid and is centered during this process.

In a preferred development, the closure head contains a cover shell and a joining ring molded onto the cover shell, the joining ring and the underlying support ring in each case having at their ends facing one another an annular shoulder, in such a manner that the two shoulders are interlocked. The fact that the shoulders or steps alternately engage behind one another in the manner described ensures that closure head and support ring are brought together in a self-centering manner during the production or assembly of the covering element. The joining ring can protrude at an angle from the cover shell and have a longitudinal extent. However, it is also possible to integrate the shoulder disposed at the closure head directly into the edge of the cover shell. Finally, multiple shoulders or interlocking can also be provided.

The shapes of the two shoulders are advantageously matched to one another in such a manner that the joining ring and the support ring rest without gaps against one another over the entire transverse extent. Such seating with accurate fit achieves high tightness of the configuration. Furthermore, the load pressure and twisting forces transferred to the support ring from the closure head are uniformly distributed over the entire available cross-sectional area of the two components joined to one another.

In a preferred embodiment, the lateral offset of the shoulders is selected in such a manner that the shoulder disposed at the support ring encircles the shoulder of the joining ring from the outside and thus forms a border for the part located on the inside.

To join the closure head permanently and durably to the support ring, a number of holding pins or bolts are preferably provided, the respective holding pin or bolt being advantageously inserted into a hole passing through the shoulders of joining ring and support ring. The respective hole is preferably aligned perpendicularly to the axis of the support ring, i.e. geodetically horizontally in the operating position. As already mentioned above, the bolts only need to absorb forces when the covering element, that is to say the closure head together with the support ring, is lifted out of the reactor pressure vessel or subsequently inserted into it again. For this purpose, the covering element is raised with a crane-like device engaging the closure head. The support ring is then "suspended" from the closure head, as it were. The bolts or holding pins introduced into the holes are mainly stressed for shear during this process.

The holding pins or bolts are preferably secured against displacement, wherein conventional securing devices such as, for example, securing pins or the like, can be used. In particular, it is also possible to weld the holding bolts to the closure head or to the support ring for securing them.

In an alternative or additional advantageous embodiment, the closure head can also be force-lockingly joined to the support ring by a number of screws or threaded bolts. In a particularly preferred embodiment, the respective mounting screw or the threaded bolt passes through the cover shell of the closure head and is fixed on the support ring side in a mounting bracket molded or welded onto the support ring. The mounting screw or the threaded bolt advantageously has an external thread. The mounting bracket and possibly also the closure head correspondingly have a cutout, provided with a corresponding internal thread, for the screw or the threaded bolt. The screw or the threaded bolt is advantageously aligned parallel to the axis of the support ring, that is to say vertically in the operating position, so that when the covering element is lifted, the connecting elements are loaded for torsion. The mounting screw or the threaded bolt can also be secured by a nut or a lock nut at its top end at the cover end. In addition, the mounting screw or the threaded bolt can be secured by welding it to the closure head and/or to the support ring or to its mounting bracket.

The covering element is suitably used in a boiling water reactor, where it closes the reactor pressure vessel at the top end in the operating state.

The advantages which can be achieved by the invention consist, in particular, in that two forged parts, which in each case can be produced in a relatively simple manner, are joined form-lockingly and/or force-lockingly by suitable connecting elements to form a relatively complex covering element which can be disassembled in one operation and as one unit during maintenance work on the reactor core and particularly when the core grid is being equipped with fuel assemblies. Due to the fact that the joint between the closure head and the support ring is produced by a form-locking and/or force-locking connection, bulky welding seams subject to corrosion, and the associated repetitive inspection and repair work can be dispensed with.

Other features which are considered as characteristic for the invention are set forth in the appended claims.

Although the invention is illustrated and described herein as embodied in a covering element for a reactor core of a nuclear installation, and a nuclear reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a diagrammatic, partial cross-sectional view of a second embodiment of the covering element.

DESCRIPTION OF THE PREFERRED EMBODIMENTS

Figures 1A, 1B:
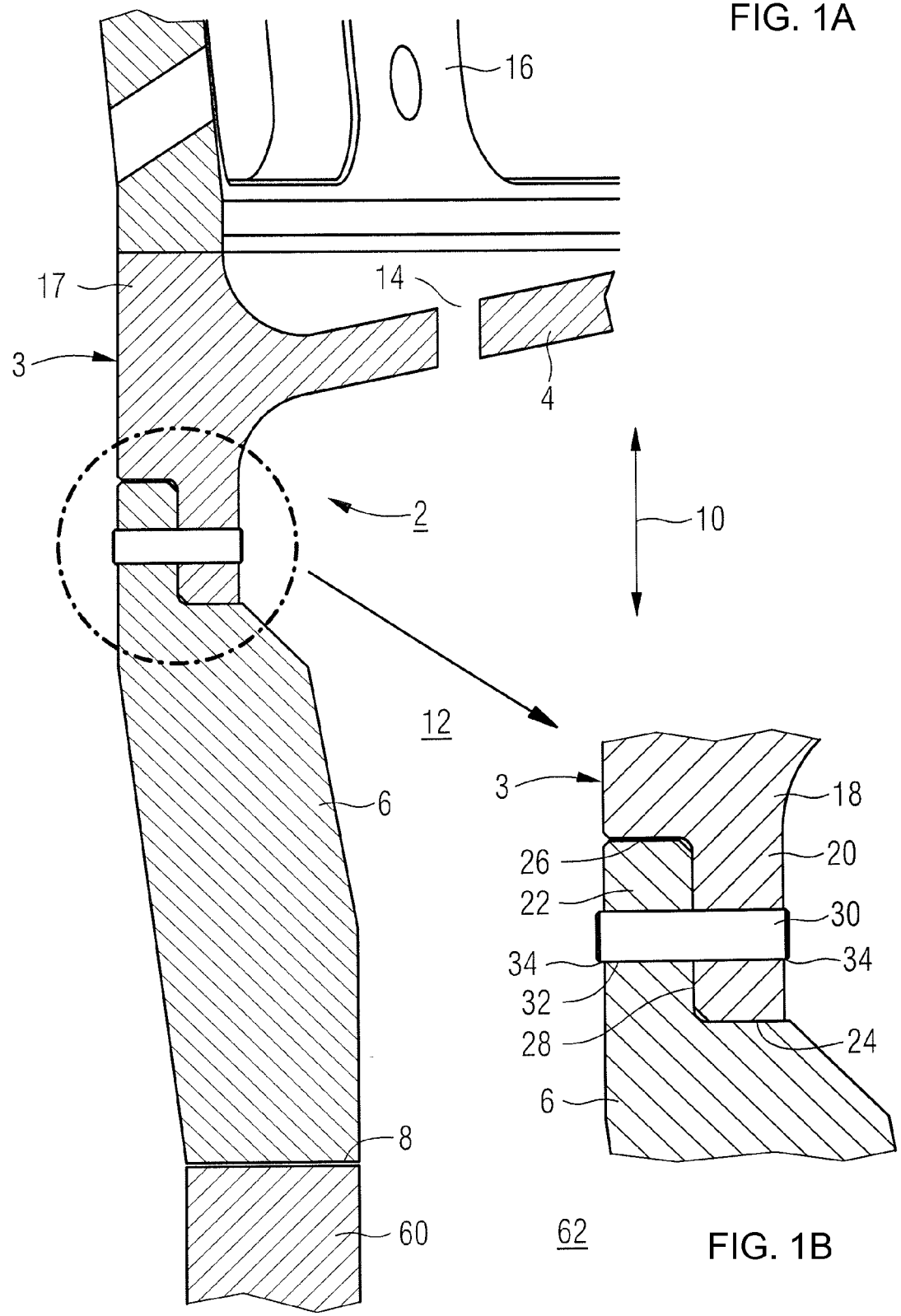
FIG. 1A is a diagrammatic, partial cross-sectional view through a first embodiment of a covering element for a reactor core of a boiling water reactor according to the invention.
FIG. 1B is a detailed view of the area shown in dashed lines in FIG. 1A.

In all the figures of the drawing, sub-features and integral parts that correspond to one another bear the same reference symbol in each case. Referring now to the figures of the drawing in detail and first, particularly, to FIG. 1A thereof, there is shown a section of a cross section through a covering element 2 for a reactor core 62 of a boiling water reactor, the detail marked by the dashed circle in the left-hand half of FIG. 1A is shown on an enlarged scale in FIG. 1B. The covering element 2 is disposed in an interior of a non-illustrated reactor pressure vessel, and, in its operating position, closes the core area with the fuel assemblies contained therein towards the top. The covering element 2 contains a closure head 3 with a spherically curved flattened cover shell 4 and a support ring 6, joined to the cover shell 4, of a substantially cylindrical form. The support ring 6 is mounted detachably at its lower edge 8 on a core grid 60 intended for receiving fuel assemblies. The core grid is not shown since the details of mounting are not of further interest here.

Due to the support ring 6 being inserted between the core grid and the closure head 3, the distance between the dome-shaped cover shell 4 and the underlying core area with the fuel assemblies is enlarged in a longitudinal direction 10 compared with an embodiment without the support ring 6. In the vapor space or mixture space 12 enclosed by the cylindrical support ring 6, the water-steam mixture forming in the reactor pressure vessel during the reactor operation can accumulate and become homogenized before it enters through penetration ports 14, disposed in the closure head 3, into the stand-pipes, adjoining towards the top, of a water-steam separator, not shown in greater detail here. On the closure head 3, an annular joining flange 17 is also molded on, on which a support structure 16 is mounted which is used as support for a steam dryer, not shown in greater detail here.

On the cover shell 4 of the closure head 3, a cylindrical joining ring 18 bent away towards the bottom at an angle is molded on which has at its lower end an annular shoulder 20. The shoulder 20 matches an also annular corresponding shoulder 22 at an upper edge of the support ring 6 in such a manner that, considered in cross section, a simple interlock is formed. The two shoulders 20, 22 in each case have the same height so that both the inner support faces 24 and the outer support faces 26, offset in height, of the support ring 6 and the joining ring 18 rest flat on one another. The support faces 24, 26 in each case have a circular form and are in each case located in a horizontal plane. The shoulders 20, 22 are constructed at right angles in such a manner that vertically oriented contact faces 28, forming a cylindrical surface area, of the two shoulders 20, 22 also rest against one another without gaps. The edges of the shoulders 20, 22 can be slightly beveled or rounded. In the exemplary embodiment, both shoulders 20, 22 have the same width so that the bearing forces are uniformly distributed to the upper (outer) and to the lower (inner) circular ring.

To permanently connect and secure the configuration, a number of bolts 30 distributed around the cylindrical structure in the circumferential direction are provided in the exemplary embodiment according to FIGS. 1A and 1B. Each of the bolts 30 is seated with accurate fit in a corresponding cutout or hole 32 which extends in the radial direction through the two shoulders 20, 22 of support ring 6 and joining ring 18. The length of the respective bolt 30 is slightly greater than the length of the hole 32 given by the total wall thickness in this area. To secure the bolt 30 against displacement, it is welded to the respective shoulder 20, 22 (securing seam 34) at the outer circular boundary edge of the hole 32.

The support ring 6 and the closure head 3 are therefore held by both a form-locking connection and a force-locking connection. A form-locking connection is one that connects two elements together due to the shape of the elements themselves, as opposed to a force-locking connection, which locks the elements together by force external to the elements.

In the second exemplary embodiment according to FIG. 2, the mounting of the closure head 3 on the support ring 6 is changed inasmuch as an elongated threaded bolt 36 passes through an associated cutout 38 in the cover shell 4 of the closure head 3 and is held at its lower end in a cutout 42, provided with an internal thread, in a mounting bracket 44 of the support ring 6. The mounting bracket 44 protruding into the interior of the cylinder is welded to the inside wall of the support ring 6. However, the mounting bracket 44 can also be forged on in order to avoid welding seams. At its upper end, which protrudes from the cover shell 4, the threaded bolt 36 is secured by a nut 48. Similar to the previous exemplary embodiment, the threaded bolt 36 can be additionally secured by welding the threaded bolt 36 to the closure head 3 or to the mounting bracket 44.

Figure 3:
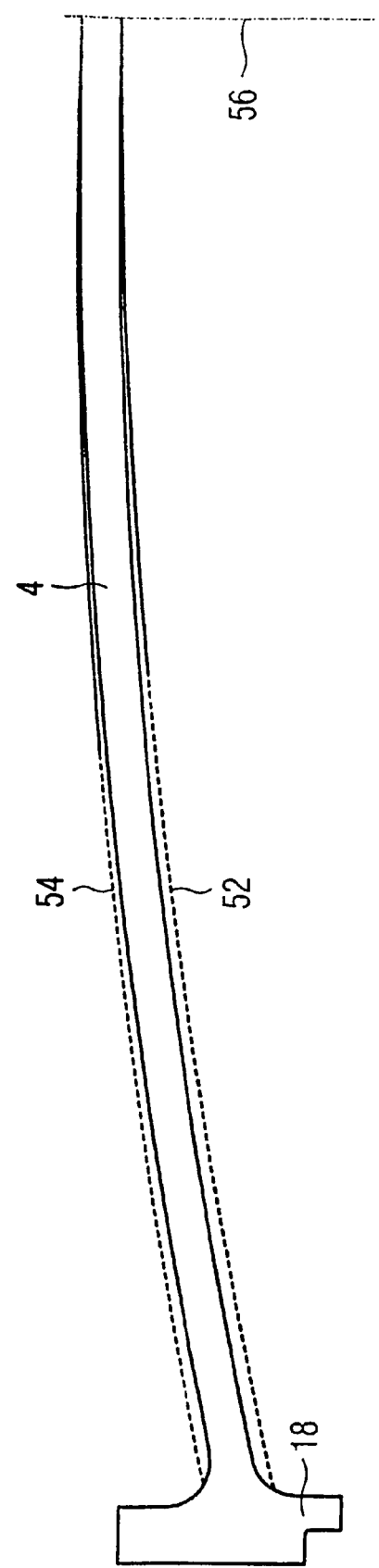
FIG. 3 is a diagrammatic, partial cross-sectional view through a closure head of the covering element.

In the concept presented here, it may be appropriate, particularly for static reasons, to disregard the hitherto usual uniform thickness of the cover shell 4. Instead, it may be advantageous to continuously increase the wall thickness of the cover shell 4 starting from its center towards the outside as shown in FIG. 3, in order to achieve a particularly high stability and stiffness. That is to say, the thickness of the cover shell 4 is greater in the vicinity of the cylindrical joining ring 18 than in the center. This can be achieved, for example, by the center points of the radii associated with an inside 52 and an outside 54 of the cover shell 4 being disposed to be offset or eccentric along the center axis 56. This results in the advantageous shape of the cover shell 4, shown by dotted lines in FIG. 3, which deviates from the previously used embodiment according to the continuous lines.

This application claims the priority, under 35 U.S.C. §119, of German application DE 10 2005 037 589.8, filed Aug. 5, 2005; the prior application is herewith incorporated by reference in its entirety.

I claim:

1. A covering element for a nuclear reactor core of a nuclear installation, the covering element comprising:
   a closure head including a dome-shaped cover shell for closing the nuclear reactor core during operation of the nuclear reactor core, said closure head including an edge;
   a separate support ring including an edge; and
   a joint connecting said edge of closure head and said edge of said separate support ring being formed substantially without a welding seam;
   said joint enabling said closure head together with said separate support ring to be removed from the nuclear reactor core or from a core shroud, which surrounds the nuclear reactor core, as one complete unit.

2. The covering element according to claim 1, wherein said closure head and said support ring are in each case forged monolithic parts.

3. The covering element according to claim 1, wherein said closure head rests on said support ring in an operating position.

4. The covering element according to claim 1, wherein said closure head includes a joining ring molded onto said cover shell, said joining ring and said support ring in each case having at their ends facing one another an annular shoulder, said annular shoulders being interlocked.

5. The covering element according to claim 4, wherein said annular shoulders having shapes matched to one another such that said joining ring and said support ring rest without gaps against one another over an entire transverse extent.

6. The covering element according to claim 4, wherein said shoulder of said support ring encircles said shoulder of said joining ring from an outside.

7. The covering element according to claim 4, further comprising a number of fasteners selected from the group consisting of pins and bolts for joining said closure head to said support ring.

8. The covering element according to claim 7, wherein said shoulders have holes formed therein and said fasteners are disposed in said holes passing through said shoulders of said joining ring and said support ring.

9. The covering element according to claim 8, wherein said holes are aligned perpendicularly to an axis of said support ring.

10. The covering element according to claim 4, further comprising an number of fasteners selected from the group consisting of mounting screws and threaded bolts joining said closure head to said support ring.

11. The covering element according to claim 10, further comprising a mounting bracket disposed on said support ring, said fasteners pass through said cover shell of said closure head and are fixed in said mounting bracket.

12. The covering element according to claim 10, wherein said fasteners are aligned parallel to an axis of said support ring.

13. The covering element according to claim 10, further comprising nuts and said fasteners are secured by said nuts at an end located above said cover shell.

14. The covering element according to claim 7, wherein said fasteners are secured against displacement.

15. The covering element according to claim 14, wherein said fasteners are welded to said closure head and/or to said support ring.

16. The covering element according to claim 10, wherein said fasteners are secured against displacement.

17. The covering element according to claim 16, wherein said fasteners are welded to said closure head and/or to said support ring.

18. The covering element according to claim 1, wherein said dome-shaped cover shell of said closure head is configured to close the reactor core or the core shroud.

19. The covering element according to claim 1, wherein closure head and said support ring are constructed as two separate parts that are joined together.

* * * * *